United States Patent
Berenguer (10) Patent No.: US 11,980,173 B2
(45) Date of Patent: May 14, 2024

(54) SYSTEM FOR CLEANING WALLS OF AQUATIC BASINS

(71) Applicant: ABYSSNAUT, Olliergues (FR)

(72) Inventor: Jerome Berenguer, Olliergues (FR)

(73) Assignee: ABYSSNAUT, Olliergues (FR)

( * ) Notice: Subject to any disclaimer, the term of this patent is extended or adjusted under 35 U.S.C. 154(b) by 688 days.

(21) Appl. No.: 17/258,573

(22) PCT Filed: Jun. 12, 2019

(86) PCT No.: PCT/IB2019/054905
§ 371 (c)(1),
(2) Date: Jan. 7, 2021

(87) PCT Pub. No.: WO2020/016674
PCT Pub. Date: Jan. 23, 2020

(65) Prior Publication Data
US 2021/0267180 A1    Sep. 2, 2021

(30) Foreign Application Priority Data

Jul. 18, 2018 (FR) ...................................... 18/70839

(51) Int. Cl.
*A01K 63/10* (2017.01)
*E04H 4/16* (2006.01)

(52) U.S. Cl.
CPC ........... *A01K 63/10* (2017.01); *E04H 4/1654* (2013.01)

(58) Field of Classification Search
CPC ........... B08B 9/08; B08B 9/087; A01K 63/10; A01K 63/04; A01K 63/006; A47L 1/00; A47L 1/06; E04H 4/1654

USPC ......................................................... 15/409
See application file for complete search history.

(56) References Cited

U.S. PATENT DOCUMENTS

| 2004/0194237 A1* | 10/2004 | Walton | E04H 4/1663 15/1.7 |
| 2010/0301139 A1* | 12/2010 | Achord | B63B 59/10 239/380 |
| 2013/0192632 A1* | 8/2013 | Cazzaniga | B63B 59/08 134/6 |

(Continued)

FOREIGN PATENT DOCUMENTS

| CN | 106725141 A | 5/2017 | |
| DE | 202013000530 U1 * | 8/2013 | ............... B05B 3/06 |
| EP | 1738642 A1 | 1/2007 | |

(Continued)

OTHER PUBLICATIONS

Translation of DE 202013000530 U1 (Year: 2013).*
International Search Report dated Nov. 5, 2019, for International Patent Application No. PCT/IB2019/054905.

*Primary Examiner* — Steven M Cernoch
*Assistant Examiner* — Steven Huang
(74) *Attorney, Agent, or Firm* — KARCESKI IP LAW, PLLC (57) ABSTRACT

System for treating inner walls of aquatic basins, including at least one working head, a mobility assembly for moving the working head along a wall to be treated, the working head having a working disc arranged in a rotational manner and connected to a rotary shaft which can be driven by a disc motor, the working disc bearing a wall contact foam having a plurality of radial slots connecting the center of rotation of the disc to the periphery of the disc.

8 Claims, 5 Drawing Sheets

(56) References Cited

U.S. PATENT DOCUMENTS

2015/0307169 A1\* 10/2015 Højer ................ B08B 1/04
 114/337

FOREIGN PATENT DOCUMENTS

| EP | 1947932 A2 | 7/2008 |
|----|------------|--------|
| EP | 2012581 A1 | 1/2009 |
| FR | 2335269 A1 | 7/1977 |
| FR | 3033229 A1 | 9/2016 |
| JP | 3155630 U | 11/2009 |
| WO | 0040080 A1 | 7/2000 |
| WO | 2006078921 A1 | 7/2006 |
| WO | 2008006259 A1 | 1/2008 |
| WO | 2007127472 A2 | 11/2008 |

\* cited by examiner

SYSTEM FOR CLEANING WALLS OF AQUATIC BASINS

CROSS-REFERENCE TO RELATED APPLICATIONS

This is a National Stage Entry into the United States Patent and Trademark Office from International Patent Application No. PCT/IB2019/054905, filed on Jun. 12, 2019, which claims priority to French Patent Application No. FR 18/70839, filed on Jul. 18, 2018, the entire contents of both of which are incorporated herein by reference.

FIELD OF THE INVENTION

The present invention relates to a system for treating walls of aquatic tanks. It relates more particularly to a system for treating internal walls of aquatic tanks having at least one working head, a mobility assembly for moving the working head along a wall to be treated, the working head comprising a rotary working disk.

DISCUSSION OF RELATED ART

Aquatic tanks such as aquariums are intended to be viewed by the public and therefore have to have clean walls with a high quality of transparency. The transparent surfaces of the aquatic tanks therefore need to be cleaned regularly. The majority of tanks have several varieties of fish and marine plants, which are often are source of various kinds of dirt and cause the deposition of biofilms along the walls of the tank. The biofilms can easily impede the visibility of an aquarium after just a few days. Cleaning work on the walls therefore needs to be repeated at regular intervals in order to prevent the biofilm from becoming too thick and difficult to remove.

Various prior art processes are used to clean the transparent surfaces of aquariums. Often, the known processes require not only intrusive means that are detrimental to the life forms present in the aquatic tanks but also laborious human intervention that is not easy to implement.

Generally, the cleaning of transparent surfaces of aquatic tanks is carried out by hand. Large tanks are often cleaned by operators positioned on available surfaces above the tank. They use poles provided with brushes or sponges to rub the walls. The movements carried out are irregular and certain areas can be forgotten. The quality of cleaning is often approximate on account of the application of a non-constant rubbing force and a random number of passes.

Other cleaning methods are also known. For example, systems having an element inside the tank and an element outside the tank are known, the two elements cooperating with one another by virtue of a magnetic effect. An operator, positioned outside the tank, can then move the outside element, thereby entraining the inside element.

For example, the patent application EP2012581 proposes a device for cleaning aquarium panes, and notably the insides of aquarium panes. That device has an element that can be positioned on an internal wall of the aquarium pane. The device also comprises an external element that is positioned on the external face of the wall. The internal and external elements of the device are respectively attracted by the magnetic force such that the internal element of the device follows the movements of the external element. A cleaning surface is installed within the device. This surface is turned directly against the internal wall of the aquarium. That device makes it easier to clean walls of small dimensions. For large walls, which are often high, the operator is forced to use various means to be able to cover the entire surface.

The document EP1947932 also relates to an aquarium cleaning device that has an internal component that comprises a plate used as cleaning surface, and an alternatively operative cleaning component situated on an opposite surface to the surface to be cleaned. A magnetic element is positioned on the plate and a buoyancy means is located at one end of the plate. An exterior component has a body that is fixed to the exterior surface of a wall of the aquarium. A second magnetic element is carried by the body, such that the body can be positioned between the two magnetic elements with the cleaning surface adjacent to the aquarium wall. By moving the body between the first and second positions, the internal component is moved inside the aquarium in order to clean the various surfaces.

Likewise, the application WO2008006259 describes a magnetic cleaner for cleaning aquarium panes comprising an interior cleaning element intended to slide over the interior surface of the pane. This interior cleaning element comprises a front cover, a rear cover, a magnet, and a cleaning surface. The device also comprises an exterior cleaning element positioned on the exterior surface of the pane. The magnetic force between the interior and exterior cleaning elements makes it possible to drive the movement of the interior cleaning element by moving the exterior cleaning element.

The application EP1738642 relates to a device for cleaning the internal surface of an aquarium, having an interior body. The interior body has a cleaning surface made of foam, which is intended to be in contact with the wall to be cleaned. The interior body is moved over the magnetic surface by virtue of the magnetic force linking it to an exterior component.

The document WO2007127472 also forms another example of treatment and proposes a remote surface preparation mechanism, such that the cleaning of the interior surface of an aquarium is managed from the outside. The cleaning device comprises a body provided with at least one magnetic element that is coupled, for remote control, to complementary magnetic elements, in a movable drive head located at a distance.

Finally, the document WO0040080 describes a device for cleaning aquarium panes, in particular the inside of aquarium panes. The device comprises an interior element positioned on the interior wall of the pane, and an exterior element positioned on the exterior side of the aquarium pane. These interior and exterior elements are attracted toward one another under the effect of a magnetic force, such that the movement of the exterior element along the aquarium pane causes the same movement of the interior element. The device is characterized in that the element positioned inside the aquarium is designed to float on the liquid medium contained in the aquarium when the magnetic force is no longer applied.

The document FR2335269 describes a device that can stick to the surface of a wall by suction and can move along said wall so as to carry out various kinds of work such as cleaning or painting the surfaces of walls.

The prior art, as illustrated by the documents cited above, proposes systems for polishing and/or cleaning surfaces of aquariums by virtue of different magnetic mechanisms. Such processes have a number of drawbacks, however. The magnetic force necessary for surface treatment makes it necessary to install two elements on either side of the wall of the aquatic tank to be treated. This system also makes it necessary to have easy access from the outside regardless of the arrangement of the walls to be cleaned, this not always being the case in practice. The treatment technique, in particular using magnetic mechanisms, is very often limited to relatively thin walls, thereby excluding the treatment of large aquatic tanks, the walls of which can have a thickness of several tens of centimeters. Likewise, the magnetic element fixed to the internal wall of the aquatic tank is set in motion by the setting in motion of the external element, often by human intervention, this ruling out the automation of the process. These different systems do not make it possible to adjust or vary the intensity of the force applied to the cleaning face. Finally, the cleaning face inside the tank is rapidly saturated with dirt and biofilm, considerably reducing the quality of cleaning.

Automatic systems are also known, for example the one in the application WO2006078921, which describes an automatic cleaning system for an aquarium. The cleaning system is programmed to clean an aquarium on a regular basis without requiring human intervention during the cleaning process. The cleaning system is configured to move along the side walls of the aquarium in order to clean said walls as it moves. Such a system is provided for small aquariums and small-volume tanks. Its action is restricted to the cleaning of the walls.

To remedy these various drawbacks, the invention provides various technical means.

SUMMARY OF THE INVENTION

First of all, a first objective of the invention consists in providing a system for treating, in particular cleaning walls of aquatic tanks, allowing the transparent surfaces to be cleaned with a high level of visual quality without having a detrimental effect on the environment of the living beings in the tank and without damaging the walls to be treated.

Another objective aims to provide a device for working in a continuous flow without causing difficulties as regards the regulation of load to be applied.

Finally, another objective of the invention aims to make it possible to treat different configurations of aquatic tank walls.

To this end, the invention provides a system for treating internal walls of aquatic tanks, having at least one dynamic suction head, a mobility assembly for moving the dynamic suction head along a wall to be treated, the dynamic suction head comprising a rotary disk that is arranged in a rotary manner and connected to a rotational shaft able to be driven by a disk motor, the rotary disk bearing a wall interface layer, characterized in that the wall interface layer comprises a plurality of radial grooves connecting the rotational center of the disk to the periphery of the disk and at least one orifice that ensures, when in operation in an aquatic tank in the immediate vicinity of a wall to be treated, a flow of water between the rear of the disk and the radial grooves arranged in the portion of the disk that is situated next to the wall to be treated.

The system makes it possible to clean and eliminate the biofilm present on the submerged walls of aquariums or any aquatic tank wall. When the rotary disk is driven in rotation, and it is located at a small distance from the wall to be treated, suction is effected, causing the head to be pressed against the wall. Circulation of water is realized. The water circulates in the grooves of the working disk and is ejected laterally and then released into the water of the tank. Thus, the water circulates in the rubbing foam of the disk, rinsing it and carrying away the biofilm and other dirt removed from the wall. Furthermore, the faster the working disk rotates, the higher the suction and the greater the rubbing of the wall are. Such an arrangement thus makes it possible to place and hold a working head against a wall to be treated without an operator or without the aid of a thrust propeller positioned on the opposite side from the disk. The hydrodynamic effect brought about by the rotation of the grooves makes it possible to realize a suction function. Such an arrangement makes it possible treat walls with a large area in an automatic or semi-automatic manner without human intervention in the tank.

According to one embodiment, the orifice(s) is/are disposed around the perimeter of the rotational shaft. In a variant, the rotational shaft has a through-orifice. These orifices make it possible to ensure fluidic circulation from the water of the tank to the rubbing foam and more particularly the radial grooves. The circulation of water makes it possible sustain the cleaning action of the foam by virtue of a self-cleaning effect of the latter.

According to an advantageous embodiment, the working head comprises an axial peripheral sleeve.

The axial peripheral sleeve advantageously has a circumferential side wall arranged so as to surround the working disk. In this way, the peripheral sleeve makes it possible to confine the action of the rotary foam while minimizing hydrodynamic disturbances, for example in order that sand or impurities in the vicinity of the wall are not driven into the foam.

An advantageous variant provides for an evacuation hole to be arranged through the side wall of the axial peripheral sleeve. This hole allows the flow of water to circulate toward the exterior of the peripheral sleeve, driving the impurities and dirt to the exterior of the sleeve.

According to an advantageous embodiment, the interface layer has a treatment surface and the dynamic suction head serves both to fix the treatment system to a tank wall to be treated and to carry out a cleaning or polishing treatment on the wall with the aid of said treatment surface.

According to another embodiment, the dynamic suction head serves only to fix the treatment system to a tank wall to be treated. The system then preferably provides at least one wall treatment head, separate from the dynamic suction head, designed to carry out a polishing or cleaning treatment on at least one wall of the tank.

In one exemplary embodiment, the mobility assembly for moving the dynamic suction head along the wall to be treated has at least one vertical rail and/or one horizontal rail.

In another kind of implementation, the mobility assembly for moving the dynamic suction head along the wall to be treated has a floating platform to which the treatment head is connected.

In yet another example, the mobility assembly for moving the dynamic suction head along the wall to be treated has at least one motor-driven roller.

Advantageously, the dynamic suction head comprises a cover provided with orifices.

According to a further advantageous embodiment, the walls of the grooves have lips that extend beyond the surface of the interface layer.

Advantageously, the working disk cooperates with the axial peripheral sleeve via at least one spring. The peripheral sleeve is thus movable axially with respect to the working disk. The axially sliding peripheral sleeve, which is held against the wall to be treated by one or more springs, makes it possible to decouple the load exerted by the peripheral sleeve from that exerted by the working disk. For example, a spring with a low stiffness characteristic is provided in order that the peripheral sleeve applies moderate pressure to the wall. A moderate pressure means a bearing force that makes it possible to hold the peripheral sleeve against the wall, while allowing it and the whole of the working head to slide against the wall, in order to make it possible to clean the entire submerged surface of the wall.

According to an advantageous embodiment, the mobility assembly for moving the treatment head along the wall to be treated has at least one vertical rail and/or one horizontal rail. This arrangement constitutes a simple and inexpensive implementation that is easy to mount/remove. According to an advantageous variant, the treatment system has at least one movably mounted rail.

In a variant, the mobility assembly for moving the working head along the wall to be treated has a floating platform to which the treatment head is connected.

DESCRIPTION OF THE FIGURES

All the embodiment details are given in the following description, supplemented by FIGS. 1 to 12, which are given only by way of nonlimiting examples and in which.

DETAILED DESCRIPTION OF THE INVENTION

Rotary Disk and Suction Effect

Figure 1:
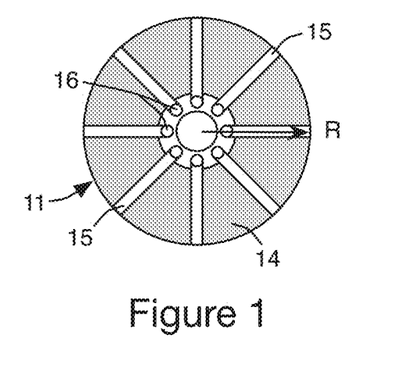
FIG. 1 is a face-on view, from the outside of an aquatic tank, of an example of a working disk.
Figure 2:
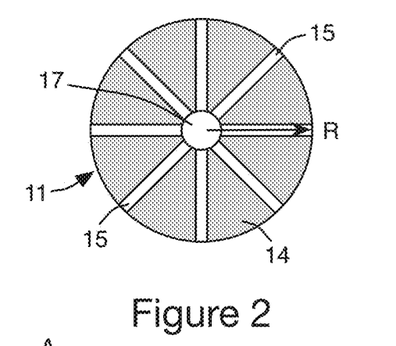
FIG. 2 is a face-on view of an embodiment variant of the working disk in FIG. 1.

FIGS. 1 and 2 illustrate exemplary embodiments of rotary disks 11 as seen from the face that is able to be contact with the wall of the tank to be treated. It is apparent that the disk 11, of radius R, comprises a plurality of radial grooves 15 or slots, i.e. ones that are oriented in the direction of the radius R. The grooves are oriented radially from the rotational center of the disk. In the exemplary embodiment in FIG. 1, a plurality of orifices 16 are arranged around the rotational shaft. Each of these orifices 16 communicates with a groove 15. In the exemplary embodiment in FIG. 2, a single orifice 17 is arranged centrally in the rotational shaft 12 connecting the disk 11 to a motor 13 that is visible in FIGS. 3 and 4. The central orifice 17 communicates with each of the grooves 15. On account of this or these orifice(s) 16 or 17 and the grooves 15, when the disk is set in rotation in the immediate vicinity of a wall to be treated in an aquatic environment, a flow of water is generated between the rear and the front of the disk, i.e. from the rear of the disk 11, then through the disk and passing along the grooves 15 arranged radially in the portion of the disk situated next to the wall. This hydrodynamic flow generates a suction effect that tends to press the disk against the wall. The level of the suction effect is variable depending on the number and the dimensions of the grooves, on the diameter of the disk, on the material used, and especially on the speed of rotation of the disk. This suction effect allows the disks to fulfill various hydromechanical functions, as explained below.

Single- or Dual-Function Suction Head

Figure 3:
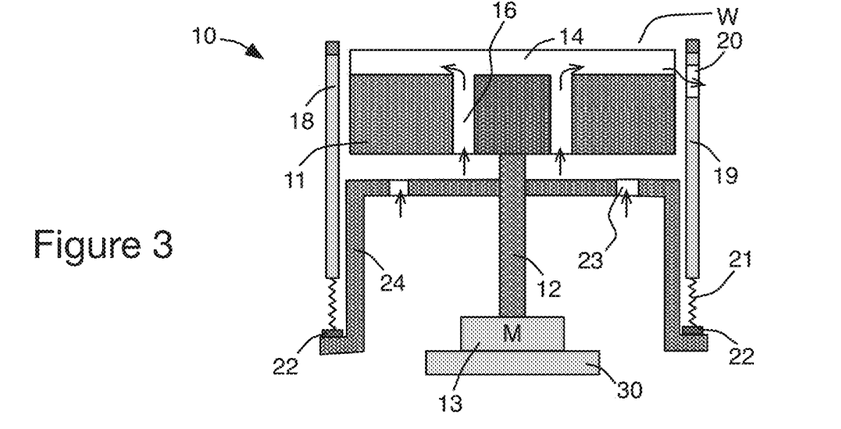
FIG. 3 is a schematic depiction of an exemplary embodiment of a treatment head.
Figure 4:
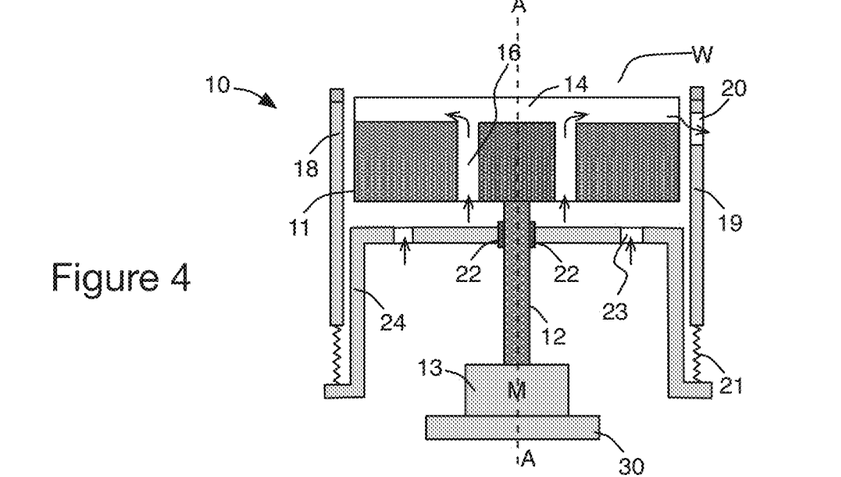
FIG. 4 is a schematic depiction of another exemplary embodiment of a treatment head.

FIGS. 3 and 4 illustrate, in cross section, examples of a dynamic suction head 10 bearing a disk such as the one illustrated in FIG. 1 or 2. As illustrated, the disk 11 has a wall interface layer 14 on the side of the disk intended to interface, with or without contact, with the wall 3 to be treated. The interface layer 14 is either separate from the disk 11 or integral with or in one piece with the disk. The disk 11 is made of a rigid and preferably nonporous material, for example aluminum. The grooves 15 and the orifices 16 and 17 are advantageously made in the mass of the disk 11.

Depending on the embodiments, the dynamic suction head implements one or two functions. Specifically, it can generate a suction function as described above. It can also generate a suction effect coupled with a wall treatment effect, for example a cleaning or polishing effect.

In the case of the dual mode, the interface layer 14 comprises a treatment surface made of a material that makes it possible to carry out cleaning work on an aquatic tank wall, often made of PMMA, without otherwise risking damaging said wall. The treatment surface may be made for example: from polyurethane or of polyethylene with variable hardnesses and densities and (open or closed) cell dimensions and porosities that are variable depending on the objectives of the treatment.

In the case of the dual mode, a variant can provide an interface layer made up of more or less flexible lips disposed in the continuation of the walls of the grooves 15 and made directly from the mass of the disk 11 or from that of the interface layer 14. What is being referred to in this case are walls of the grooves 15 perpendicular to the wall to be treated 3. These lips protrude by several millimeters from the surface of the disk 11 or from the interface layer 14. They can have a length more or less equal to the radius R of the disk 11 and may be single or double. Specifically, the presence of these lips, positioned in the grooves 15, favors the flow of water in the latter in order to evacuate the biofilm scraped off the wall during the rotation of the disk 11. Thus, in this dual-function mode, the interface layer 14 is in contact with the wall to be treated.

In the case of the single-function mode with a simple holding effect, the disk 11 is located preferably at a small distance from the wall, for example a few millimeters therefrom, in order to ensure the hydrodynamic effect, while avoiding contact with the wall.

A motor 13 and a shaft 12 oriented along the axis A-A, which are provided in the suction head, allow the rotary disk 11 to be set in rotation. When the disk is submerged and situated at a small distance (for example 1 to 2 cm for a disk with a diameter of 100 mm) from a wall to be treated, the rotation of the grooved disk produces a negative pressure that tends to move the working disk toward the wall 3, the latter being fixed. The suction head 10 is designed to be able to move toward the wall by virtue of this effect. In the case of a disk with a diameter as mentioned above, the speed of rotation that makes it possible to produce the hydrodynamic effect that tends to press the disk against the wall to be treated is for example between 800 and 1200 rpm (purely by way of example).

The arrows in FIGS. 3 and 4 illustrate an example of water flow when a suction head is in position against a wall of an aquatic tank. The water comes from the rear of the working disk, passes through the orifices 16 and 17 and then communicates with the radial grooves 15. Once the disk is in position, the flow of water takes place continuously as long as the rotation of the disk is maintained. In addition to contributing to the suction effect, this flow makes it possible to ensure that the treatment surface is cleaned in order to prevent the biofilm and other dirt removed during the cleaning of the wall from collecting on the disk and saturating the treatment surface, preventing the cleaning treatment from being continued. In this dual-function embodiment, the suction disk is in direct contact with the wall to be treated. It acts on the latter by rubbing in order to carry out a cleaning action.

The suction head 10 preferably comprises a peripheral sleeve 18 arranged coaxially with the rotational shaft 12. This sleeve has a circumferential side wall 19 designed to surround the rotary disk 11. In the examples in FIGS. 3 and 4, the sleeve continues toward the rear of the rotary disks so as to surround a portion of the shaft 12. The sleeve makes it possible to delimit a working zone W inside which the disk carries out a cleaning action against the wall to be treated. This working zone W is also delimited at the rear of the disk 11 by a cover 24, closing the sleeve 18. In the examples illustrated, the cover 24 is in the form of an inverted U, with a central opening for the shaft 12 of the motor to pass through. Complementary orifices 23 provided in the cover 24 ensure fluidic communication between the working zone W and the zone of the motor M. The cover 24 may also be flat or in the form of a non-inverted U.

An evacuation hole 20 is arranged through the side wall 19 of the axial peripheral sleeve 18. This tunnel allows the flow of water to leave the sleeve to return to the tank. The tunnel is advantageously positioned so as to be located in the upper zone of the suction head 10 during cleaning phases. This prevents the exiting flow of water from acting against the bottom of the tank, which would risk pushing stones or particles or dirt toward the working head. If a hard and/or abrasive foreign body were ever to be located between the working disk and the wall to be treated, there would be significant risks of the wall being scratched or damaged in some other way. The peripheral sleeve 18 provides additional protection against the ingress of such contaminants into the working zone W. A filtration element or system can be connected to this evacuation hole 20.

In order to prevent the peripheral sleeve 18 from exerting an excessive force on the wall 3, the rotary disk 11 cooperates with the latter via at least one spring 21. Use is made for example of a peripheral spring arranged axially in the continuation of the opposite end of the peripheral sleeve 18 from the working zone W. The spring 21 acts on the sleeve 18 on one side and on the cover 24 on the other.

In contrast to the assembly formed by the disk 11 and the interface layer 14, the peripheral sleeve 18 is designed to remain angularly fixed, without rotation, with respect to the wall to be treated. A circumferential seal or a material with a hardness less than the wall to be treated is advantageously provided at the contact end of the peripheral sleeve 18. This sleeve or material allows gentle contact with the wall, without risking damaging it. The connection between the angularly fixed part of the head and the rotary part of the head is provided by a bearing 22, for example a plain bearing or rolling bearing. FIGS. 3 and 4 illustrate two embodiments of a suction head 10. In the embodiment in FIG. 3, the parts that can be set in rotation comprise the shaft 12, the disk 11, the interface layer 14 and the cover 24. The bearing 22 is arranged between the cover and the spring 21. In the embodiment in FIG. 4, the parts that can be set in rotation comprise only the shaft 12, the disk 11 and the interface layer 14. In this case, the bearing 22 is arranged between the shaft 12 and the cover 24.

Variant with Multiple Heads

In a variant, the wall treatment system provides two or more suction heads, mounted in a group. For example, in the case of two suction heads, these are fixed together side by side or one above the other. The drives and the disks are preferably provided to rotate in opposite directions in order to compensate for the torque effect that tends to rotate a single head in the opposite direction to the actuating motor of the disk. Similarly, it is possible to provide an assembly with four suction heads mounted in two pairs of two as described above so as to form a square. Other arrangements with different, even or odd numbers of heads are also possible.

Mobility Assembly

In order to carry out cleaning operations on tank walls, the suction head 10 cooperates with a mobility assembly 30. In the following text, various examples of mobility assemblies are presented.

Mobility Assembly with Rails

Figure 5:
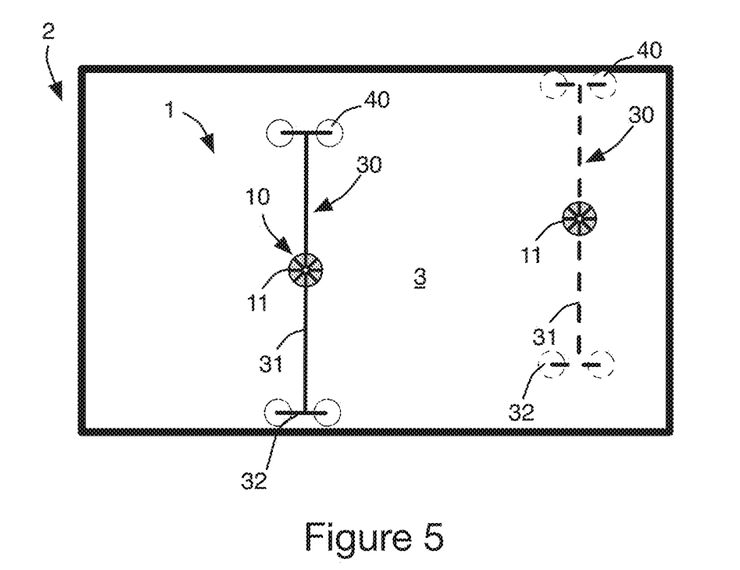
FIG. 5 is a schematic depiction of an exemplary embodiment of the wall treatment system using rails and holding heads.

FIG. 5 illustrates a first example of a mobility assembly 30 having a vertical rail 31 for moving the suction head in the vertical direction and a horizontal rail 32. According to this first exemplary embodiment, the mobility assembly has different elements for supporting and ensuring the mobility of the suction head 10. As illustrated, the mobility assembly 30 has a vertical rail 31 and two horizontal rails 32 arranged at the ends of the vertical rail. The vertical rail 31 is designed to allow the mobility of the suction head 10 by carrying out movements in translation along the axis Y. The movement of the suction head 10 in translation along the axis Y is ensured for example by a vertical movement motor provided in the suction head 10. To make the movement in translation easier, rollers are advantageously arranged between the suction head 10 and the vertical rail 31. The vertical rail 31 is for its part mounted so as to be movable along the axis X. The mobility of the vertical rail 31 on the axis X is allowed for example by one or two horizontal movement motors. By virtue of these two types of movement, a dual-function suction head can be moved over the entire area covered by the span of the rails 31 and 32.

The mobility assembly is fixed to the wall to be cleaned by means of fixed (non-rotary) suckers 40 disposed for example at the ends of the horizontal rails. These fixed suckers are advantageously connected to a suction system that is situated for example outside the tank to be treated and makes it possible to generate the suction necessary to fix the suckers.

Figure 6:
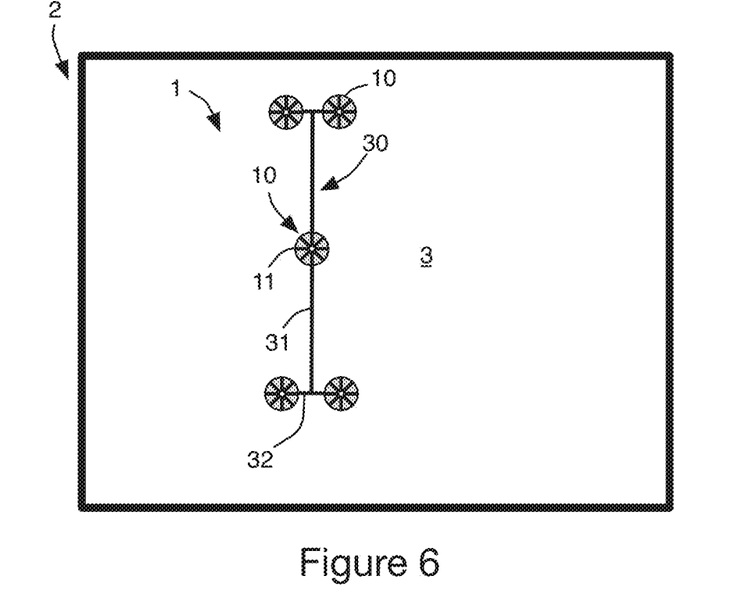
FIG. 6 is a schematic depiction of an exemplary embodiment of a wall treatment system using rails and dynamic suction heads.

In an advantageous variant, which is illustrated in FIG. 6, the fixed suckers are replaced by dynamic suction heads 10. As explained above, the suction heads are designed to produce a hydrodynamic effect that tends to suck the working disks against the wall to be treated. This effect is advantageously used to fix the mobility assembly 30 to the wall. This embodiment makes it possible to avoid the use of suction tubes connecting the vacuum pump to the various suckers of the previous example. The suction heads 10 are simply connected electrically to a control unit intended to be positioned outside the tank, for example above the latter, in an intervention zone used for maintaining the tank and for caring for the marine fauna located in the tank.

Mobility Assembly with a Floating Platform

FIGS. 7 to 10 illustrate a second example of a mobility assembly 30, of the type having a floating platform 33 to which a dual-function suction head 10 is connected. A winch 36 carries a cable 37 to which a suction head is attached. The cable makes it possible to move the suction head vertically along the wall 3 to be cleaned. The lateral movements of the floating platform 33 and consequently of the suction head 10 are effected by virtue of motor-driven rollers 34 bearing against the wall, clearly visible in FIGS. 8, 9 and 10. A propeller motor 35 makes it possible to propel the platform through the tank and to move it up to the wall to be treated. Once in the vicinity of the wall, one or more holding heads 40 or, in a variant, suction heads, hold the platform against the wall by a suction effect as described above.

Figure 7:
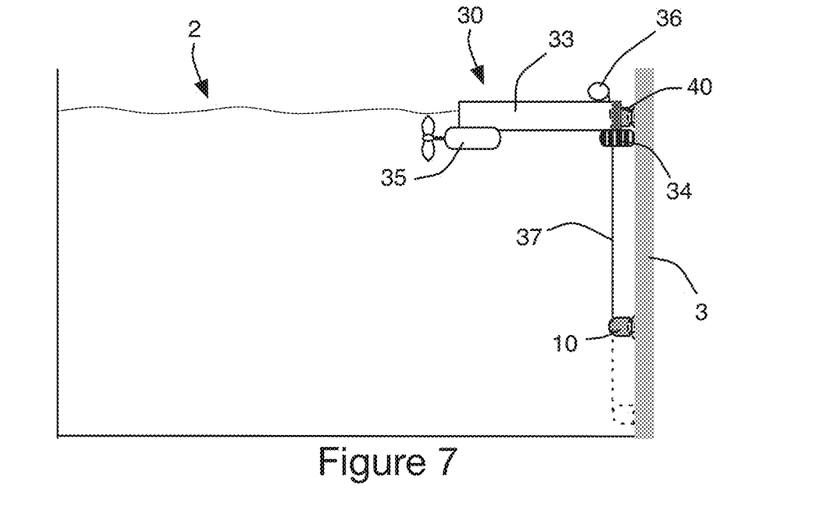
FIG. 7 is schematic depiction of an exemplary embodiment of a wall treatment system using a floating platform.
Figure 8:
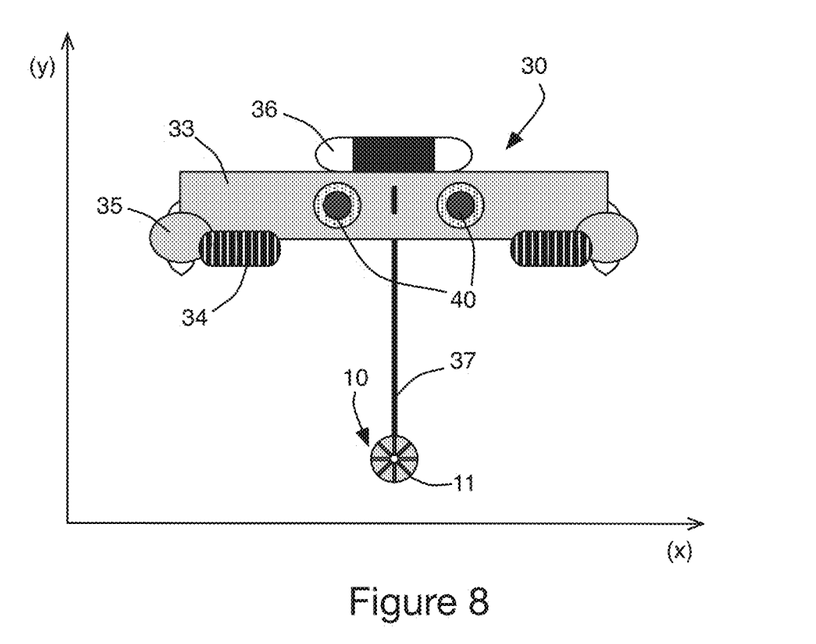
FIG. 8 is a schematic depiction, in the form of a face-on view, of an example of a floating platform carrying a working head.
Figure 9:
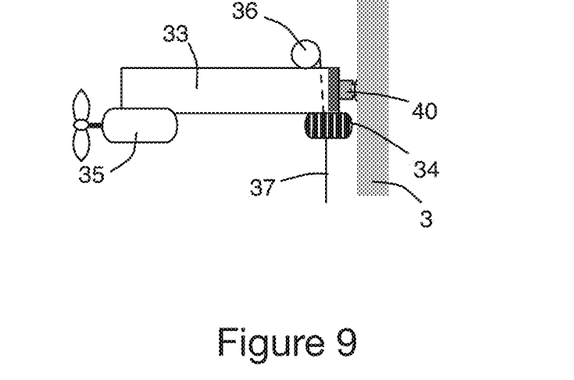
FIG. 9 is a schematic depiction, in the form of a side view, of the floating platform in FIG. 8.
Figure 10:
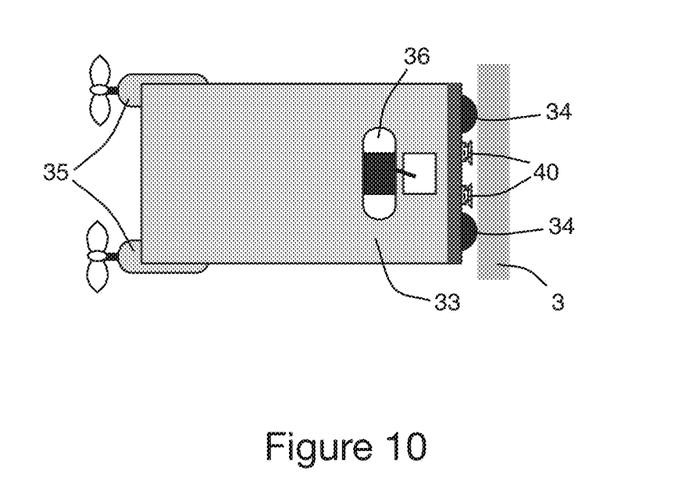
FIG. 10 is a schematic depiction, in the form of a top view, of the floating platform in FIG. 8.

In a variant, the sliding of the peripheral sleeve 18 with respect to the cover 24 is eliminated or reduced, further improving the hydrodynamic effect and the resultant holding force. To this end, use is made of one or more springs with greater stiffness characteristics or the spring(s) 21 is/are eliminated. Preferably, these elements rotate without being in contact with the wall to be treated 3, several millimeters away therefrom, by virtue of optimum adjustment of the abutment of the peripheral sleeve 18. In FIGS. 7 and 8, the holding head 40 is bearing against the wall 3. In FIG. 10, the two holding heads 40 are away from the wall 3.

Mobility Assembly with Rollers

Figure 11:
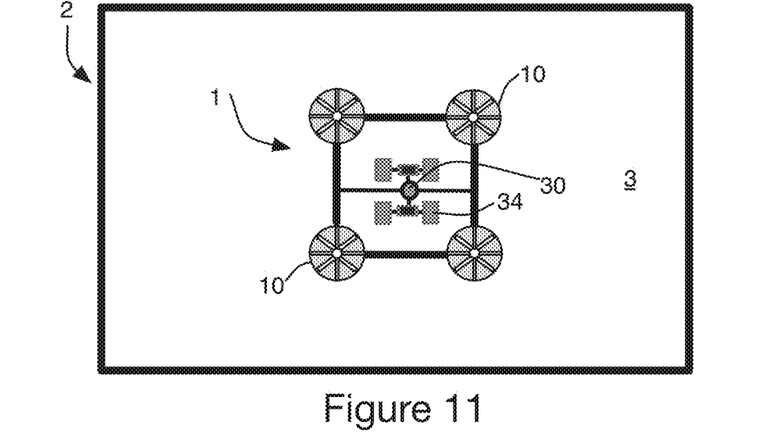
FIG. 11 is a schematic depiction of an exemplary embodiment of a treatment system, in particular a wall cleaning system, using a mobility assembly having rollers.

FIG. 11 is a schematic depiction of an exemplary embodiment of a system for treating a wall by cleaning. A set of four dual-function dynamic suction heads 10 make it possible both to fix the system 1 to the wall 3 to be cleaned and to carry out the cleaning of the wall by means of a non-abrasive mechanical rubbing action, for example with the aid of the wall interface layer 14, which is specifically designed to carry out this cleaning function, as described above in relation to FIGS. 3 and 4. In the example illustrated, the dynamic heads 10 are provided at the four corners of the treatment system so as to allow easier access to the edges and corners of the walls to be treated. Other types of configuration can be provided. The mobility assembly 30 comprises a plurality of rollers 34 disposed so as to be in contact with the wall in order to roll over the latter. The rollers are in this case mounted in pairs spaced apart by a central electric motor, the assembly being remote-controlled by a suitable remote control. The action of the rollers rolling against the wall makes it possible to move the treatment system. The suction power of the dynamic suction heads is regulated and adapted so as to allow both a fixing force against the wall while allowing the movement along the latter through the action of the rollers. The roller carriage can pivot, for example by desynchronizing the speeds of rotation of the wheels on each side, thereby making it possible to move the treatment system in all useful directions.

Figure 12:
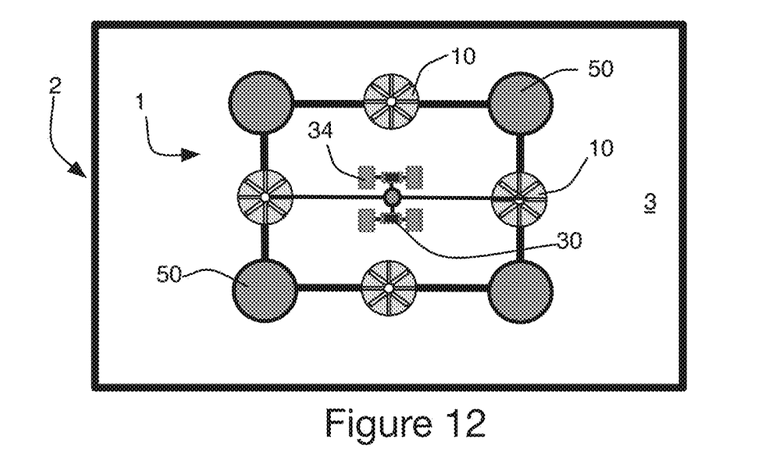
FIG. 12 is a schematic depiction of an exemplary embodiment of a treatment system, in particular a wall polishing system, using a mobility assembly having rollers.

FIG. 12 is a schematic depiction of an exemplary embodiment of a system for treating a wall by polishing. A set of four single-effect dynamic suction heads 10 make it possible to fix the system 1 to the wall 3 to be cleaned. Four working heads 50 adapted for polishing tasks are provided at the four corners of the device in order to carrying out the polishing of the wall by means of a slightly abrasive mechanical rubbing action of the known type.

In the example illustrated, the independent heads 50 are provided at the four corners of the treatment system so as to allow easier access to the edges and corners of the walls to be treated. Other types of configuration can be provided. The mobility assembly 30 comprises a plurality of rollers 34 such as those described above in relation to FIG. 11.

The invention claimed is:

1. A system for cleaning aquarium internal walls, having at least one dynamic suction head, a mobility assembly for moving at least one dynamic suction head along a wall to be treated, the at least one dynamic suction head comprising a rotary disk connected to a rotational shaft and driven by a disk motor, the rotary disk bearing a wall interface layer provided with a rubbing foam, wherein the rubbing foam comprises a plurality of radial grooves arranged in a portion of the rotary disk that is situated next to the wall to be treated, wherein the plurality of radial grooves connect a rotational center of the rotary disk to a periphery of the rotary disk, wherein the rotary disk comprises at least one orifice that ensures, when in operation in an aquatic tank in an immediate vicinity of the wall to be treated, a hydrodynamic flow of water between a rear of the rotary disk and a front of the rotary disk, through the rotary disk and passing along the plurality of radial grooves of the rotary disk and being ejected laterally and released into the aquatic tank, the hydrodynamic flow generating a suction effect to press the rubbing foam in contact against the wall to be treated, wherein the dynamic suction head has a double function, a first function for acting as a suction head to fix the dynamic suction head to the wall to be treated, and a second function to carry out a cleaning treatment on the wall to be treated with the aid of the rubbing foam, in which the water circulates in the rubbing foam of the disk, rinsing the rubbing foam and carrying away biofilm and other dirt removed from the wall to be treated.

2. The system as claimed in claim 1, wherein the at least one orifice is disposed around a perimeter of the rotational shaft.

3. The system as claimed in claim 1, wherein the rotational shaft has a through-orifice.

4. The system of claim 1, wherein the dynamic suction head further comprises an axial peripheral sleeve having a circumferential side wall arranged so as to surround the rotary disk wherein an evacuation hole is arranged through the side wall of the axial peripheral sleeve.

5. The system of claim 1, further comprising at least one wall treatment head, separate from the dynamic suction head, designed to carry out a polishing or cleaning treatment on the wall to be treated.

6. The system of claim 1, wherein the rotary disk has a rotation speed, and the level of the suction effect is variable depending on the speed of rotation of the disk.

7. The system of claim 1, wherein the rotary disk has a predetermined number of the plurality of radial grooves having predetermined dimensions and the level of the suction effect is variable depending on the predetermined number and the predetermined dimensions of the plurality of radial grooves.

8. The system of claim 1, wherein the rotary disk has a diameter and a level of the suction effect is variable depending on the diameter of the rotary disk.

* * * * *